(12) United States Patent
Maruo

(10) Patent No.: US 8,919,888 B2
(45) Date of Patent: Dec. 30, 2014

(54) SEAT BELT GUIDING CONSTRUCTION

(75) Inventor: Kenichiro Maruo, Hamamatsu (JP)

(73) Assignee: Suzuki Motor Corporation (JP)

( * ) Notice: Subject to any disclaimer, the term of this patent is extended or adjusted under 35 U.S.C. 154(b) by 2459 days.

(21) Appl. No.: 10/862,974

(22) Filed: Jun. 8, 2004

(65) Prior Publication Data

US 2004/0251676 A1    Dec. 16, 2004

(30) Foreign Application Priority Data

Jun. 10, 2003    (JP) ............................... P2003-164449

(51) Int. Cl.
*B60R 22/34*    (2006.01)
*B60R 22/26*    (2006.01)
*B60R 22/18*    (2006.01)

(52) U.S. Cl.
CPC ......... B60R 22/26 (2013.01); *B60R 2022/1818* (2013.01)
USPC .......................................... 297/483; 280/807

(58) Field of Classification Search
CPC .......... B60R 22/26; B60R 22/24; B60R 22/34
USPC .......................................................... 705/16
See application file for complete search history.

(56) References Cited

U.S. PATENT DOCUMENTS

| | | | | |
|---|---|---|---|---|
| 4,993,746 A | * | 2/1991 | Hagelthorn | 280/806 |
| 5,263,741 A | * | 11/1993 | Seros et al. | 280/808 |
| 5,364,170 A | * | 11/1994 | West | 297/483 |
| 5,599,070 A | | 2/1997 | Pham et al. | |
| 5,658,051 A | * | 8/1997 | Vega et al. | 297/483 |
| 5,716,073 A | | 2/1998 | Redman | |

FOREIGN PATENT DOCUMENTS

| | | |
|---|---|---|
| JP | 4-135949 | 5/1992 |
| JP | 6-247255 | 9/1994 |
| JP | 10-250430 A1 | 9/1998 |
| JP | 11-147449 | 6/1999 |
| JP | 2001-097095 A1 | 4/2001 |

OTHER PUBLICATIONS

Willems, Steph. Ford takes Spark Street, showcases a hstory of safety. Nepean Barrhaven EMC. Jun. 23, 2011.*
Ford Introduces industry's first Inflatable Seat Belts to Enhance REar Sear Safety. PR Newswire. Nov. 5, 2009.*
Bag blows out candles. The Gold Coast Bulletin. Nov. 2, 2005.*
Japanese Official Action (with English Translation).

* cited by examiner

*Primary Examiner* — Hani M Kazimi
*Assistant Examiner* — John Preston
(74) *Attorney, Agent, or Firm* — Lerner, David, Littenberg, Krumholz & Mentlik, LLP

(57) ABSTRACT

There is provided a seat belt guiding construction capable of regulating the longitudinal and transverse movement of a seat belt.
In a seat belt guiding construction including a retractor 12 for a seat belt, which is installed in a seat back 2; a belt guide portion 13 for a seat belt 5, which is disposed in an upper end portion of the seat back 2; and a seat belt cover 11 which is mounted at a belt takeout port 6 for taking the seat belt 5 out of the seat back 2, the belt guide portion 13 is made up of a front guide portion 8b for guiding the front surface of the seat belt 5, side guide portions 9c for guiding the side of the seat belt 5, and a rear guide portion 9b for guiding the rear surface of the seat belt 5; a slit 9a through which the seat belt 5 passes into the guide is formed in the side guide portion 9c or the rear guide portion 9b; and the attachment portion for the seat belt cover 11 is formed in the belt guide portion 13.

6 Claims, 7 Drawing Sheets

SEAT BELT GUIDING CONSTRUCTION

FIELD OF THE INVENTION AND RELATED ART STATEMENT

The present invention relates to a seat belt guiding construction in which a retractor is installed in a seat back.

For a three people rear seat for an automobile (see FIG. 1), the seat belts for the right and left seats are wound by the retractors installed on respective rear pillars, and the seat belt for the central seat is wound by the retractor installed in the seat back of the seat (belt in seat, for details, see Japanese Patent Provisional Publication No. 10-250430).

As shown in FIG. 8, in a seat back 52, a takeout opening 51 for taking out a seat belt 55 for central seat is provided at the upper part of the seat back 52 so as to face upward. Near the takeout opening 51 is provided a belt guide 53 formed of plate-shaped or rod-shaped steel. To the belt guide 53 is installed a pipe-shaped upper frame 54 provided in the seat back 52.

Also, the belt guide 53 can be installed to a plate-shaped seat back frame, in place of the upper frame 54, via a mounting fixture (for example, see Japanese Patent Provisional Publication No. 2001-97095).

At the takeout opening 51 for taking out the seat belt 55, a seat belt cover 56 is mounted. On the seat belt cover 56 is formed a holding portion 59 that holds an attachment member 58 provided at the opening edge of a skin 57 of the seat back 52 so that the seat belt cover 56 is fixed to the seat back 52.

As shown in FIG. 9, the belt guide 53 and the upper frame 54 form a seat belt insertion hole 61 through which the seat belt 55 passes. The seat belt 55 is inserted through the insertion hole 61, whereby the right and left positions thereof are regulated. The seat belt 55 taken out of a retractor 62 is guided toward the takeout opening 51 by passing through the insertion hole 61.

However, in order to insert the seat belt 55 through the seat belt insertion hole 61, it is necessary to insert a tongue 60 installed to the seat belt 55 through the seat belt insertion hole 61 at the same time. Since the tongue 60 is wider than the seat belt 55 as shown in FIG. 9, the size in the width direction of the belt guide 53 must be made larger than the width of the seat belt 55 to insert the tongue 60 through the seat belt insertion hole 61. Therefore, the seat belt 55 can move freely in the width (transverse) direction on the inside of the belt guide 53 through a distance corresponding to the size increased in the width direction, which poses a problem in that the belt guide 53 cannot regulate the movement of the seat belt 55 sufficiently.

OBJECT AND SUMMARY OF THE INVENTION

The present invention has been made in view of the above situation, and accordingly an object thereof is to provide a seat belt guiding construction which can regulate the longitudinal and transverse movement of a seat belt and has a further simplified construction.

To solve the problem with the above-described related art, the present invention provides a seat belt guiding construction including a retractor for a seat belt, which is installed in a seat back; a belt guide portion for a seat belt, which is disposed in an upper end portion of the seat back; and a seat belt cover which is mounted at a belt takeout port for taking the seat belt out of the seat back, wherein the belt guide portion is made up of a front guide portion for guiding the front surface of the seat belt, side guide portions for guiding the side of the seat belt, and a rear guide portion for guiding the rear surface of the seat belt; a slit through which the seat belt passes into the guide is formed in the side guide portion or rear guide portion; and the attachment portion for the seat belt cover is formed in the belt guide portion.

A bracket for installing the seat belt cover is provided on an upper frame of the seat back, and a front attachment portion for the seat belt cover is formed on the top surface of the bracket.

Also, the side guide portions and rear guide portion can be formed integrally by a rod-shaped member having a circular cross section.

Further, the front guide portion is formed into a U shape by a rod-shaped member having a circular cross section, and side end portions of the U shape are fixed to the rear end surface of the upper frame with the side end portions facing downward.

As described above, in the seat belt guiding construction in accordance with the present invention including a retractor for a seat belt, which is installed in a seat back; a belt guide portion for a seat belt, which is disposed in an upper end portion of the seat back; and a seat belt cover which is mounted at a belt takeout port for taking the seat belt out of the seat back, the belt guide portion is made up of a front guide portion for guiding the front surface of the seat belt, side guide portions for guiding the side of the seat belt, and a rear guide portion for guiding the rear surface of the seat belt; a slit through which the seat belt passes into the guide is formed in the side guide portion or rear guide portion; and the attachment portion for the seat belt cover is formed in the belt guide portion. Therefore, the longitudinal and transverse positions of the seat belt can be regulated. Also, the belt guide can provide both a belt guide portion function and a seat belt cover attachment portion function.

Also, a bracket for installing the seat belt cover is provided on an upper frame of the seat back, and a front attachment portion for the seat belt cover is formed on the top surface of the bracket. Therefore, the thickness of the seat belt cover can be made thin.

Since the side guide portions and rear guide portion are formed integrally by a rod-shaped member having a circular cross section, the number of parts can be reduced. Also, by this configuration, the fabrication can be made easy.

Further, the front guide portion is formed into a U shape by a rod-shaped member having a circular cross section, and side end portions of the U shape are fixed to the rear end surface of the upper frame with the side end portions facing downward. Therefore, the strength of the belt guide attachment portion can be increased.

DETAILED DESCRIPTION OF PREFERRED EMBODIMENTS

An embodiment in accordance with the present invention will now be described in detail with reference to FIGS. 1 to 7.

In this embodiment, explanation is given of a wider seat back 2 of a rear seat 1 for three people which is divided at a ratio of 6:4 to the right and left. This seat back 2 is provided with a seat belt 5 for a passenger on the central seat, and this seat belt 5 is configured so as to be capable of being pulled upward through a takeout port 6 provided at the upper part of the seat back 2.

Figure 1:
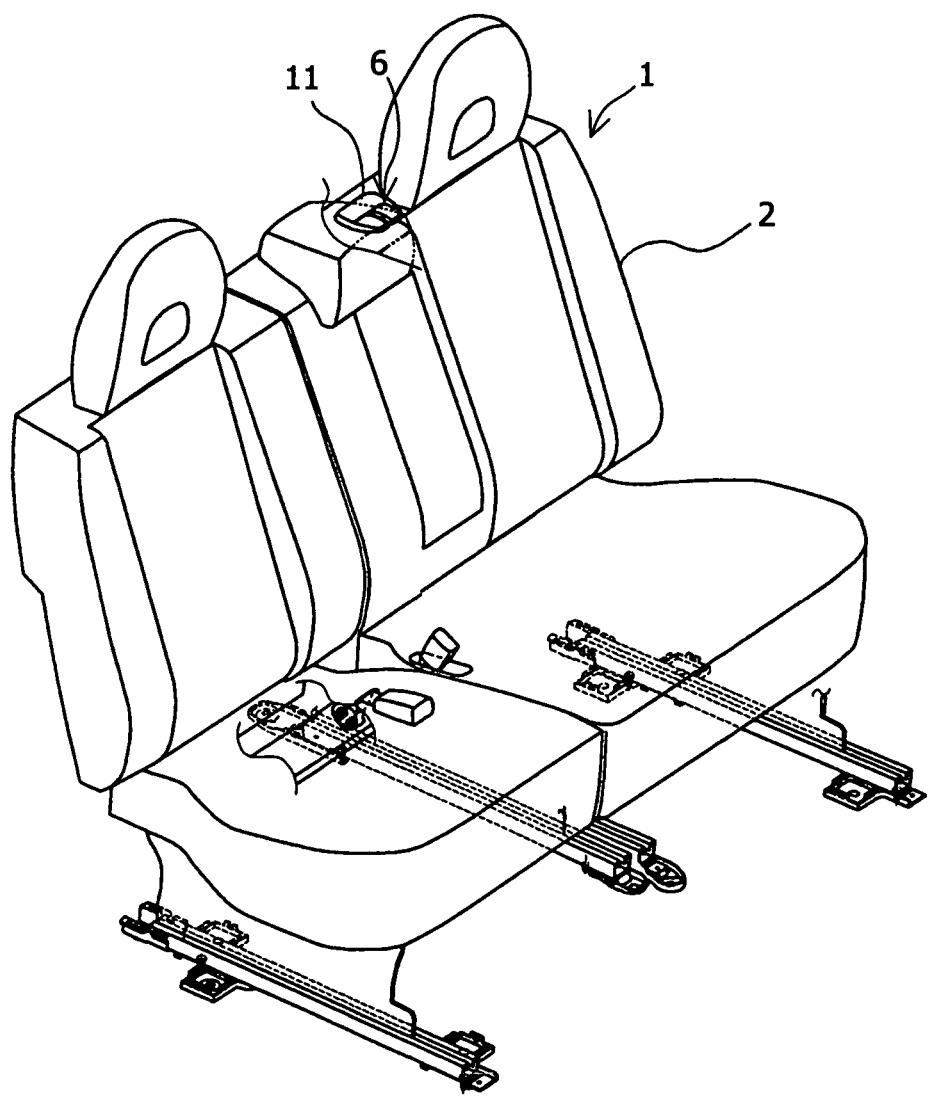
FIG. 1 is a perspective view of a seat for three people provided with a seat belt guiding construction in accordance with an embodiment of the present invention.
Figure 2:
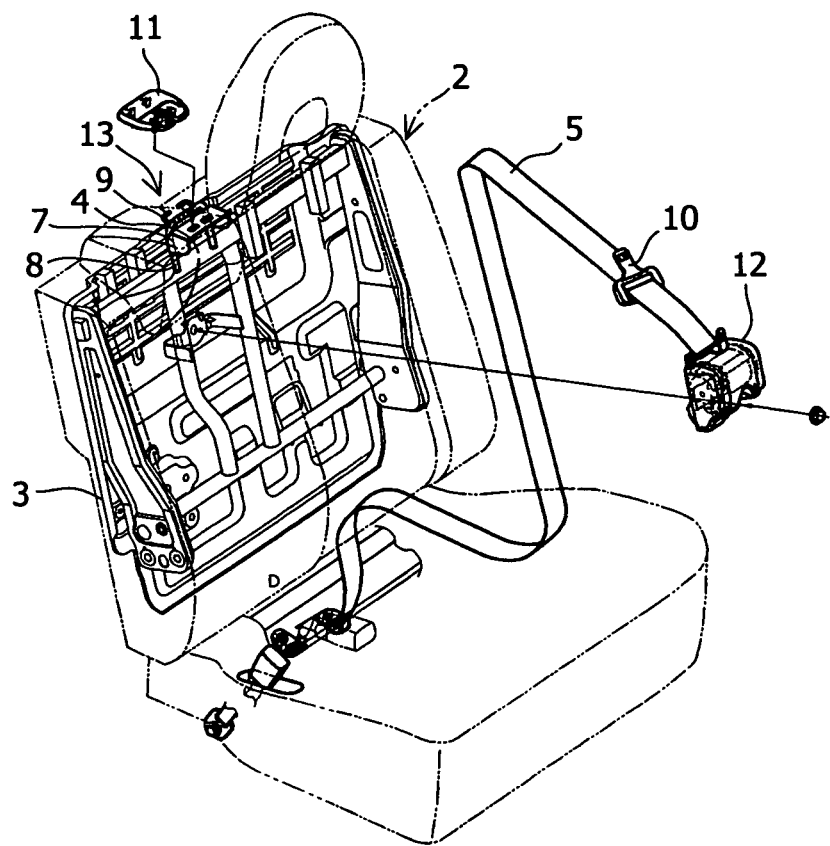
FIG. 2 is a perspective view showing the interior of a seat back provided with a seat belt guiding construction in accordance with an embodiment of the present invention.
Figure 3:
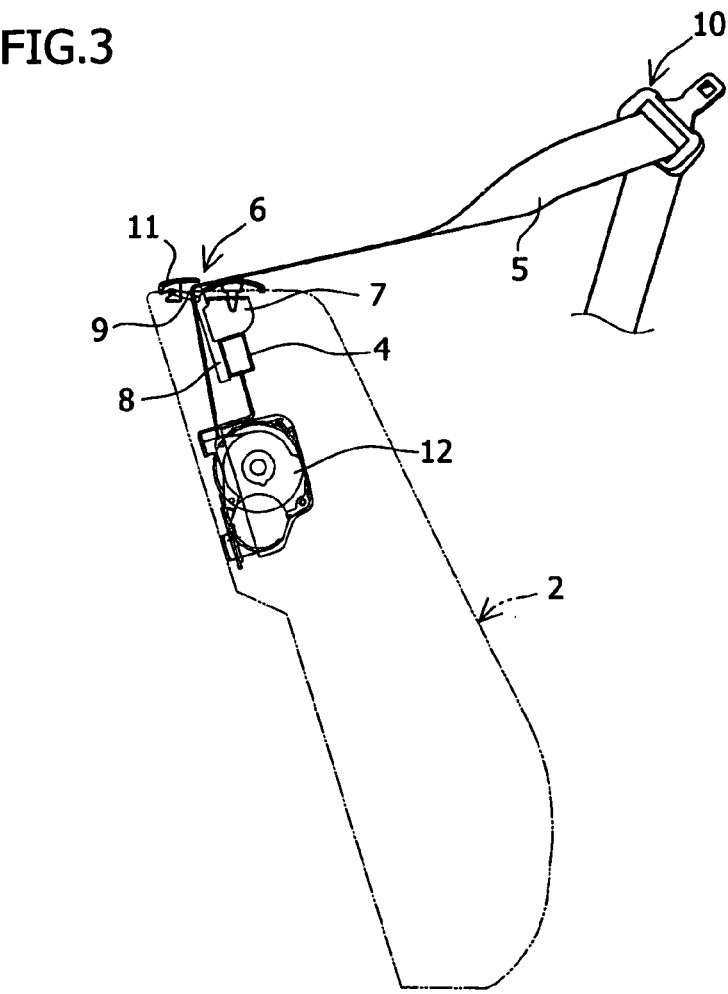
FIG. 3 is a sectional view of a seat back provided with a seat belt guiding construction in accordance with an embodiment of the present invention, viewed from the side.

As shown in FIG. 2, in the seat back 2, a seat back frame 3 is provided substantially over the whole of the seat back 2. The seat back frame 3 is fitted with a retractor 12 for winding the seat belt 5, an upper frame 4 formed into a rectangular shape in cross section, and the like.

Figure 4:
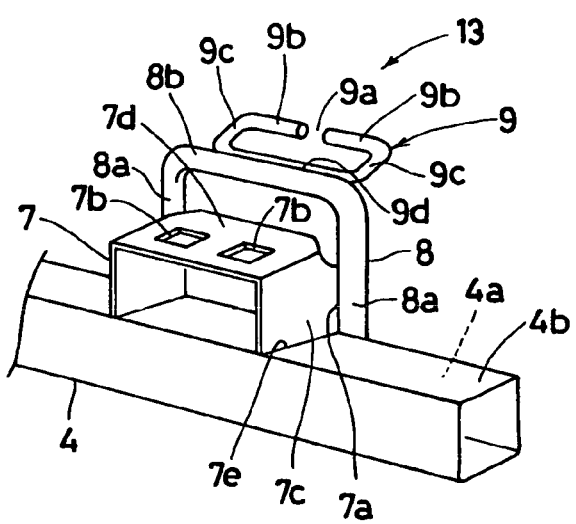
FIG. 4 is a perspective view showing a belt guide portion of a seat belt guiding construction in accordance with an embodiment of the present invention.

The upper frame 4 is installed in the upper end portion of the seat back frame 3, and extends in the width direction of the seat back 2. In the central portion in the width direction of the upper frame 4, as shown in FIG. 4, a seat belt cover bracket (bracket) 7, a belt guide bar 8, and a belt guide wire (belt guide) 9 are provided, and a seat belt cover 11 (see FIG. 3) for covering these elements is installed. The seat belt cover 11 is formed with the takeout port 6 for taking out the seat belt 5.

The belt guide bar 8 is made up of two side end portions 8a extending vertically, which are formed by rod-shaped members having a circular cross section, and a horizontal portion (front guide portion) 8b connecting the upper end portions of the two side end portions 8a to each other. That is to say, the belt guide bar 8 is formed integrally by bending a rod-shaped member into a U shape, and is disposed so that the opening of the U shape faces downward. The lower ends of the two side end portions 8a are fixed to a rear end surface 4a of the upper frame 4 by welding. The horizontal portion 8b is located above the top surface 4b of the upper frame 4, and is installed substantially in parallel with the top surface 4b. The outer peripheral surface of the horizontal portion 8b forms a gentle circumferential surface so that the seat belt 5 can slide on the peripheral surface thereof.

The seat belt cover bracket 7 is made up of two side surface portions 7c extending vertically, which are formed by flat-plate members, and a top surface portion 7d connecting the upper ends of the two side surface portions 7c to each other. That is to say, the seat belt cover bracket 7 is formed integrally by bending a flat-plate member substantially into a U shape in cross section, and is disposed so that the opening of the U shape faces downward. The two side surface portions 7c are disposed so that the surfaces thereof face in the vehicle width direction. The seat belt cover bracket 7 is fixed by welding lower end portions 7e and rear end portions 7a thereof in a state in which the lower end portions 7e of the side surface portions 7c are placed on the top surface 4b of the upper frame 4 and the rear end portions 7a of the side surface portions 7c are brought into contact with the side end portions 8a of the belt guide bar 8. The top surface 7d of the seat belt cover bracket 7 is disposed substantially in parallel with the horizontal portion 8b of belt guide bar 8, and the vertical position of the top surface 7d is slightly lower than the horizontal portion 8b. The top surface 7d is formed with mounting holes 7b for installing the seat belt cover 11, described later.

The belt guide wire 9 is formed integrally by bending a strong rod-shaped member having a circular cross section into a substantially rectangular shape. The diameter of the rod-shaped member of the belt guide wire 9 is smaller than the diameter of the belt guide bar 8. The belt guide wire 9 is made up of a horizontal attachment portion 9d (see FIG. 5), which is provided so as to extend in the vehicle width direction and is fixed to the lower side of the horizontal portion 8b of the belt guide bar 8 by welding, two side guide portions 9c (see FIG. 4), which are provided so as to extend in the vehicle rear direction, and rear guide portions 9b, which are connected to the rear ends of the two side guide portions 9c and are provided in parallel with the horizontal attachment portion 9d. In an intermediate portion in the width direction between the rear guide portions 9b, there is provided a slit 9a through which the seat belt 5 is inserted in the substantially rectangular shape of the belt guide wire 9. The rear guide portion 9b protrudes slantwise upward to the rear from the horizontal attachment portion 9d, and is located at almost the same height position as that of the top surface 7d of the seat belt cover bracket 7.

The slit 9b has a width such that a thick portion of the seat belt 5 can pass through the slit 9b. The inside width (distance between the opposed side guide portions 9c) in the vehicle width direction of the belt guide wire 9 is approximately equal to or slightly larger than the width of the seat belt 5, and is smaller than the inside width of the belt guide bar 8. Also, the inside width in the vehicle width direction of the belt guide wire 9 is a width such that the seat belt 5 can pass through, but a tongue 10 (see FIG. 2 or 3) of the seat belt 5 cannot pass through. By inserting the seat belt 5 through the belt guide wire 9, the longitudinal and transverse (especially transverse) positions of the seat belt 5 can be regulated.

By the above-described configuration, in the embodiment in accordance with the present invention, a belt guide portion 13 is made up of the front guide portion 8b for guiding the front surface of the seat belt 5, the side guide portions 9c for guiding the sides of the seat belt 5, and the rear guide portion 9b for guiding the rear surface of the seat belt 5.

Figure 5:
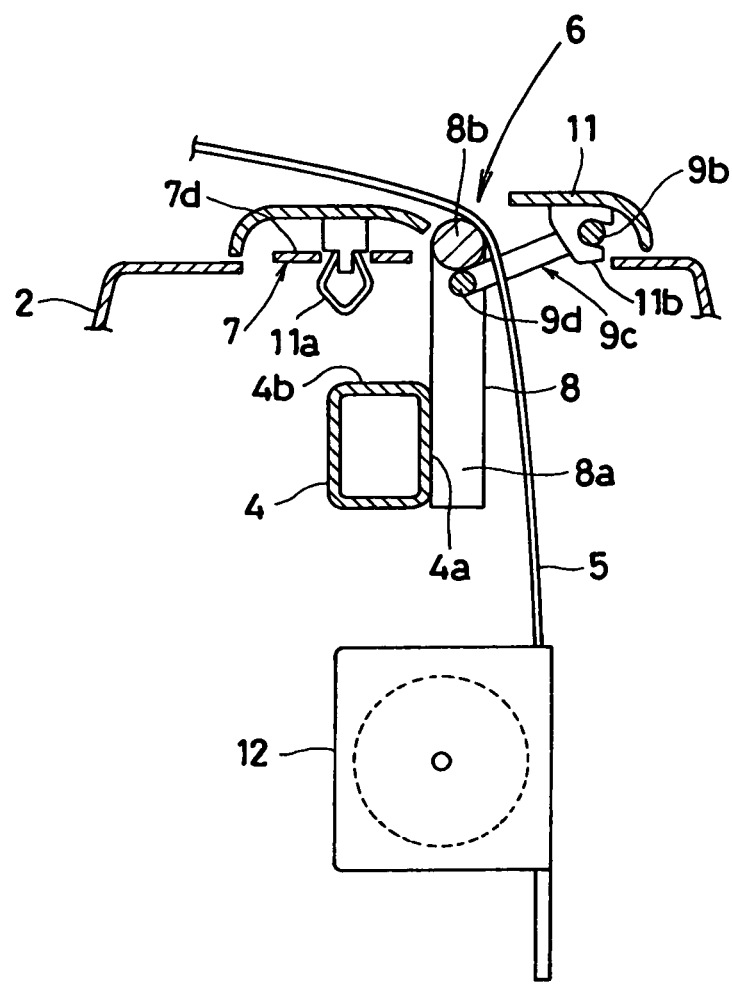
FIG. 5 is a sectional view of a seat back provided with a seat belt guiding construction in accordance with an embodiment of the present invention, viewed from the side.
Figure 6A:
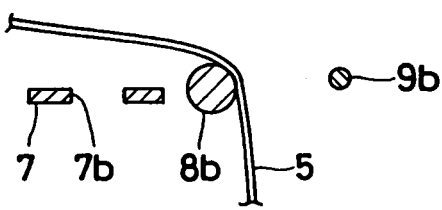
FIG. 6 is a view showing the installation of a seat belt cover of a seat belt guiding construction in accordance with an embodiment of the present invention, FIG. 6(a) showing a state before installation, FIG. 6(b) showing a state during installation, and FIG. 6(c) showing a state after installation.
Figure 6B:
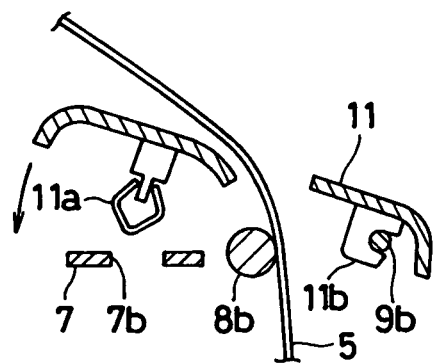
Figure 6C:
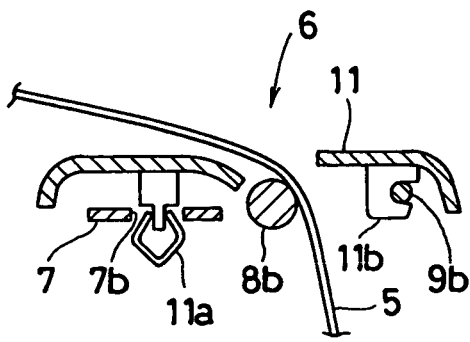

As shown in FIG. 5, the seat belt cover 11 formed with the takeout port 6 for taking out the seat belt 5 is installed so as to cover the belt guide portion 13 for the seat belt 5. On the back surface of the seat belt cover 11, as shown in FIGS. 6 and 7, two engagement claws 11a are provided on the front end side, and two bearers 11b are provided on the rear end side. The seat belt cover 11 is installed by supporting the rear guide portions (engagement wires) 9b on the rear end side of the belt guide wire 9 on the bearers 11b and by fitting the engagement claws 11a in the paired mounting holes 7b formed in the top surface 7d of the seat belt cover bracket 7.

The engagement claw 11a is provided so as to extend downward from the body of the seat belt cover 11, and an elastic portion for engagement is provided at the tip end part of the engagement claw 11a. As viewed from the side shown in FIG. 7(b), the elastic portion is provided, in the longitudinal direction of vehicle, with a tip portion, which widens in the width direction upward from the tip end part, an intermediate portion, which narrows in the width direction upward from the upper end of the tip portion, and an engagement portion, which widens again in the width direction from the upper end of the intermediate portion. When the tip portion of the elastic portion of the engagement claw 11a is inserted in the mounting hole 7b, the tip portion is bent toward the center of the engagement claw 11a so as to match the hole shape of the mounting hole 7b. When the engagement claw 11a is inserted completely in the mounting hole 7b, the edge portion of the mounting hole 7b is locked by the intermediate portion and the engagement portion of the elastic portion. A pressing force for pressing the engagement portion to the outside by the tip end part of the elastic portion is applied to the edge of the mounting hole 7b.

The bearer 11b is provided under the seat belt cover 11, and is provided with a notch portion in which the rear guide portion 9b is installed. As viewed from the side as shown in FIG. 7(b), a notch of the notch portion is provided so as to extend upward to the front from a rear and lower end portion of the bearer 11b to a substantially central portion thereof. The notch portion is formed so that the notch width is equal to or slightly narrower than the diameter of the rear guide portion 9b. Also, the terminal of notch in the central portion of the bearer 11b is formed into the same shape as the outer peripheral shape of the rear guide portion 9b so that the seat belt cover 11 can be turned around the rear guide portion 9b after the seat belt cover 11 is installed to the rear guide portion 9b.

Figure 7A:
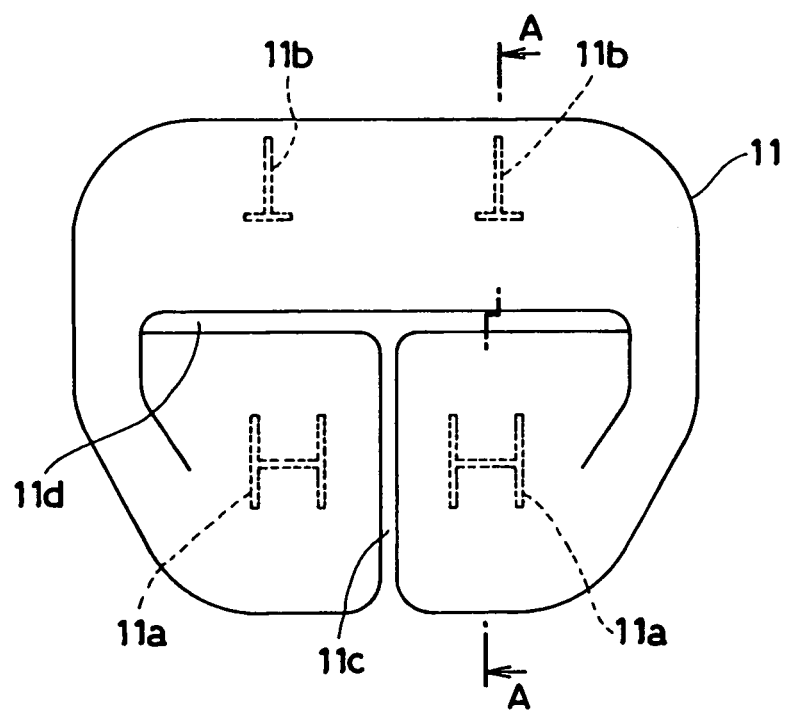
FIG. 7 is a view showing a seat belt cover of a seat belt guiding construction in accordance with an embodiment of the present invention, FIG. 7(a) being a top view, and FIG. 7(b) being a sectional view taken along the line A-A of FIG. 7(a)
Figure 7B:
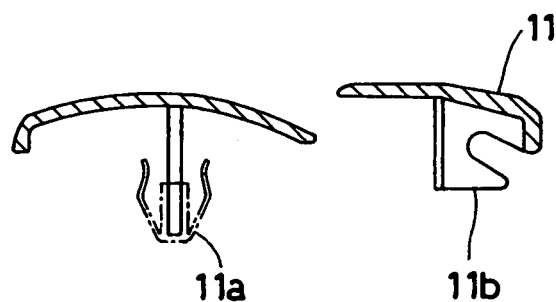
Figure 8:
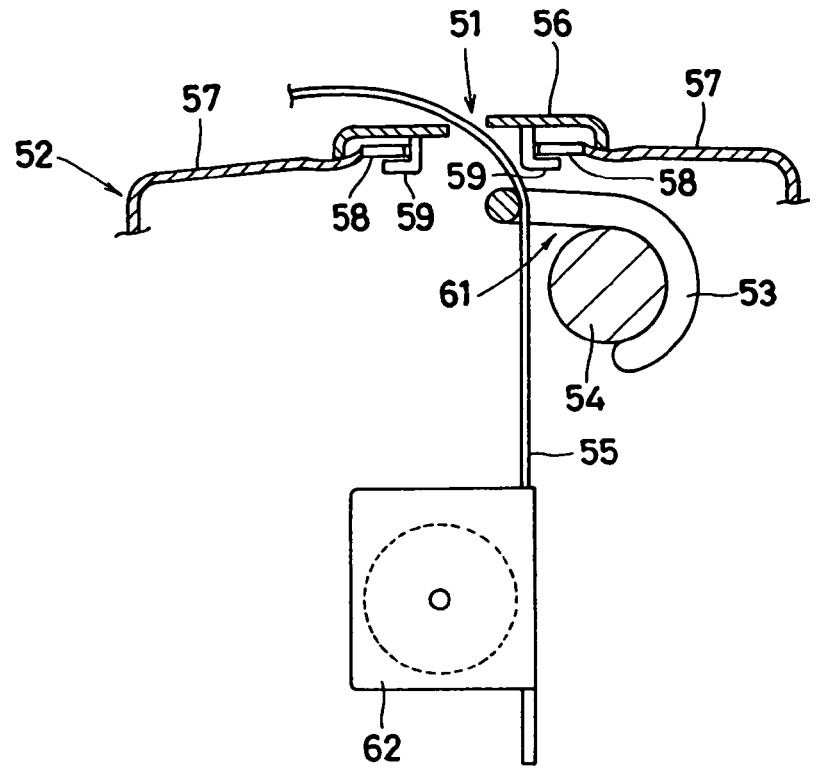
FIG. 8 is a sectional view of a conventional seat belt guiding construction, viewed from the side.
Figure 9:
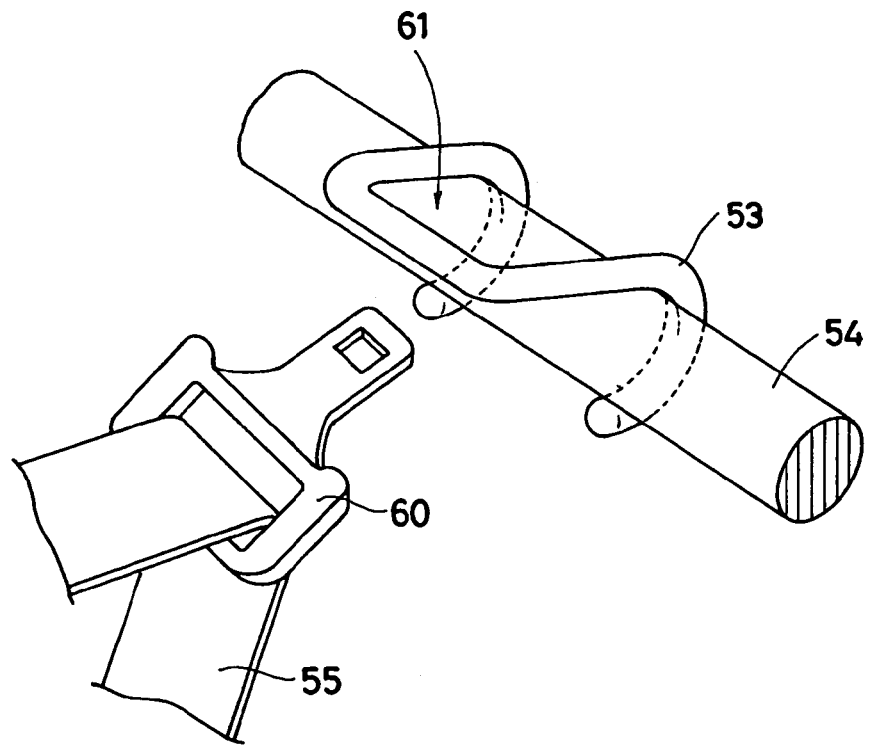
FIG. 9 is a perspective view of an insertion hole in a belt guide portion for a seat belt in a conventional seat belt guiding construction.

As shown in FIG. 7(a), the seat belt cover 11 is provided with a longitudinal slit 11c formed rearward from the tip end side of the seat belt cover 11 to a substantially central position and a transverse slit 11d formed transversely in the center of the seat belt cover 11 at the rear end of the longitudinal slit 11c. By the slits 11c and 11d, the substantially T-shaped takeout port 6 for taking out the seat belt 5 is formed in plan view. The longitudinal slit 11c is formed so that the seat belt 5 can be passed through with the thickness direction being directed to the vehicle width direction. The transverse slit 11d is formed so that the slit length (the length in the vehicle width direction) thereof is slightly larger than the width of the seat belt 5, and the groove length (the length in the longitudinal direction of vehicle) thereof is slightly larger than the thickness of the seat belt 5.

The mounting holes 7b for mounting the seat belt cover 11 in the seat belt cover bracket 7 and the engagement wires 9b on the rear end side of the belt guide wire 9 are provided so as to be at almost the same height position, so that the seat belt cover 11 is arranged horizontally, and hence the thickness of the belt cover 11 can be made thin.

Next, an assembling procedure for the seat belt guiding construction in accordance with the embodiment of the present invention will be explained.
(1) The retractor 12 is installed in advance to the attachment portion in the seat back frame 3 (see FIG. 2)
(2) The seat belt 5 is pulled out of the retractor 12, and the seat belt 5 and the tongue 10 are pulled out to the upper end side of the seat back frame 3 through a gap between the upper frame 4 and a back panel, not shown.
(3) The seat belt 5 between the retractor 12 and the tongue 10 is put in the substantially rectangular shape of the belt guide wire 9 through the slit 9a in the belt guide wire 9 (see FIG. 6(a)).
(4) Similarly, the seat belt 5 between the retractor 12 and the tongue 10 is arranged in the transverse slit 11d through the longitudinal slit 11c in the seat belt cover 11 (see FIG. 6(b)).
(5) After the bearers 11b of the seat belt cover 11 are installed to the engagement wires 9b of the belt guide wire 9, the seat belt cover 11 is turned around the rear guide portions 9b, and the engagement claws 11a on the front side of the seat belt cover 11 are pushed into the mounting holes 7b in the seat belt cover bracket 7 (see FIGS. 6(b) and 6(c)).

In the seat belt guiding construction in accordance with the embodiment of the present invention, by providing the side guide portions 9c, the front guide portion 8b, and the rear guide portions 9b, the longitudinal and transverse (especially transverse) positions of the seat belt 5 can be regulated. Also, by providing the attachment portion for the seat belt cover 11 on the belt guide wire 9, the belt guide portion 13 can play a role in guiding the seat belt 5 and a role of attachment portion for the seat belt cover 11. Also, by providing the mounting holes 7b for mounting the seat belt cover 11 in the top surface 7d of the seat belt cover bracket 7, the thickness of the seat belt cover 11 can be made thin. Further, by integrally forming the side guide portions 9c and the rear guide portions 9b by a rod-shaped member having a circular cross section, the number of parts can be reduced, and also the fabrication is made easy. By forming the belt guide bar 8 into a U shape by a rod-shaped member having a circular cross section and by fixing the side end portions 8a to the rear end surface 4a of the upper frame 4 with the side end portions 8a of the U shape facing downward, the strength of the belt guide portion 13 can be increased.

The above is a description of an embodiment in accordance with the present invention. The present invention is not limited to the above-described embodiment, and various changes and modifications can be made on the basis of the technical concept of the present invention. For example, although the slit 9a in the belt guide wire 9 is formed in the central portion of the rear belt guide 9b in the above-described embodiment, the slit may be provided in the side guide portion 9c of the belt guide wire 9. Also, although the belt guide bar 8 is formed by a rod-shaped member, it may be formed by a plate-shaped member. In this case, the belt guide bar 8 should be formed so that the seat belt 5 can slide smoothly.

The invention claimed is:
1. A guiding construction for a seat belt, comprising:
a seat belt retractor (12) disposed in a seat back (2), the seat back having an upper frame (4);
a belt guide portion (13) disposed in an upper end portion of the seat back for guiding a seat belt (5) extending from the seat belt retractor (12) such that the seat belt (5) passes out of the seat back (2) through a belt takeout port (6); and
a cover (11) attached to the belt guide portion (13), the cover (11) defining the belt takeout port (6) and covering the belt guide portion (13) around the belt takeout port (6);
wherein the belt guide portion (13) includes:
  a cover bracket (7) fixed to the upper frame (4) and having an attachment portion (7b) for removably attaching to the cover (11);
  a belt guide bar (8) fixed to the upper frame (4), the belt guide bar (8) comprising a first rod-shaped member defining a first guide portion (8b) for guiding a first face of the seat belt; and
  a belt guide (9) fixed to the belt guide bar (8), the belt guide (9) comprising a second rod-shaped member defining two side guide portions (9c, 9c) for guiding edges of the seat belt (5) and a second guide portion (9b) for guiding a second face of the seat belt (5) opposite to the first face;
wherein the seat belt passes through an opening defined by the first guide portion (8b) of the belt guide bar (8) and the two side guide portions (9c, 9c) and the second guide portion (9b) of the belt guide (9), the opening having substantially the same width as the seat belt (5);

wherein the second guide portion (9b) of the belt guide comprises two spaced-apart opposing members (9b, 9b) defining a gap (9a) therebetween, the gap (9a) providing a passage for introducing the seat belt (5) to the opening;

wherein the belt guide (9) is disposed substantially on a first side of the belt guide bar (8), the attachment portion (7b) of the cover bracket (7) being disposed substantially on a second side of the belt guide bar (8) opposite the first side;

wherein the cover (11) includes an engagement member (11a) configured to engage the attachment portion (7b) at a backside thereof and an engagement claw (11b) configured to engage the second guide portion (9b) of the belt guide (9);

wherein a portion of the belt takeout port (6) defined by the cover (11) is located between the engagement member (11a) and the engagement claw (11b);

wherein the portion of the belt takeout port (6) defined by the cover (11) has a transverse edge, and wherein a second gap (11c) providing a second passage for introducing the seat belt (5) to the belt takeout port (6) is defined in the cover (11), the second gap (11c) extending from the transverse edge to an outer edge of the cover (11); and wherein the cover (11) is arranged so that the transverse edge extends along a transverse portion (8b) of the belt guide bar (8) and the transverse edge is disposed substantially on the second side of the belt guide bar (8).

2. The seat belt guiding construction of claim 1, wherein the belt guide bar (8) is formed substantially into a U shape defined by two side portions (8a, 8a) and a transverse portion (8b) therebetween, wherein the transverse portion (8b) comprises the first guide portion (8b), and wherein the two side portions (8a, 8a) are fixed to the upper frame (4).

3. The seat belt guiding construction of claim 2, wherein the belt guide (9) is a continuous member formed substantially into a rectangular shape defined by a first end portion (9d), the two side guide portions (9c, 9c), and the second guide portion (9b).

4. The seat belt guiding construction of claim 3, wherein the first end portion (9d) of the belt guide (9) is fixed to the transverse portion (8b) of the belt guide bar (8).

5. The seat belt guiding construction of claim 1, wherein the cover bracket (7) comprises a flat-plate member formed substantially into a U shape defined by two side planar portions (7c, 7c) and a top planar portion (7d) therebetween; and wherein a mounting hole (7b) is disposed on the top planar portion (7d), the mounting hole (7b) being configured to engage the engagement member (11a) of the cover (11).

6. The seat belt guiding construction of claim 1, wherein the second gap (11c) is disposed substantially on the second side of the belt guide bar (8).

* * * * *